United States Patent
Zhu et al.

(10) Patent No.: US 7,788,264 B2
(45) Date of Patent: Aug. 31, 2010

(54) SYSTEMS AND METHODS FOR CLASSIFYING CONTENT USING MATRIX FACTORIZATION

(75) Inventors: Shenghuo Zhu, Santa Clara, CA (US); Kai Yu, Cupertino, CA (US); Yun Chi, Santa Clara, CA (US); Yihong Gong, Saratoga, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 327 days.

(21) Appl. No.: 11/869,899

(22) Filed: Oct. 10, 2007

(65) Prior Publication Data

US 2009/0132901 A1    May 21, 2009

Related U.S. Application Data

(60) Provisional application No. 60/867,598, filed on Nov. 29, 2006.

(51) Int. Cl.
*G06F 17/30* (2006.01)

(52) U.S. Cl. .......................... 707/739; 706/20

(58) Field of Classification Search ....................... None
See application file for complete search history.

(56) References Cited

U.S. PATENT DOCUMENTS

| 5,857,179 A * | 1/1999 | Vaithyanathan et al. ........ 707/2 |
| 2008/0005137 A1* | 1/2008 | Surendran et al. .......... 707/101 |

OTHER PUBLICATIONS

D. Cohn and T. Hofmann, "The Missing Link—A Probabilistic Model of Document Content and Hypertext Connectivity", 2001, Advances in Neural Information Processing Systems 13, MIT Press, pp. 430-436.*

S. Chakrabarti, B. Dom, and P. Indyk, "Enhanced Hypertext Categorization Using Hyperlinks", 1998, Proceedings of SIGMOD-98, ACM International Conference on Management of Data, pp. 307-318.*

CMU Worldwide knowledge base (WebKB) project. Available at http://www.cs.cmu.edu/~WebKB/.

S. Chakrabarti, B. E. Dom, and P. Indyk. Enhanced hypertext categorization using hyperlinks. In L. M. Haas and A. Tiwary, editors, *Proceedings of SIGMOD-98, ACM International Conference on Management of Data*, pp. 307-318, Seattle, US, 1998. ACM Press, New York, US.

C.-C. Chang and C.-J. Lin. *LIBSVM: a library for support vector machines*, 2001. Software available at http://www.esie.ntu.edu.tw/-cjlin/libsvm.

D. Cohn and H. Chang. Learning to probabilistically identify authoritative documents. *Proc. ICML 2000*. pp. 167-174., 2000.

D. Cohn and T. Hofmann. The missing link—a probabilistic model of document content and hypertext connectivity. In T. K. Leen, T. G. Dietterich, and V. Tresp, editors, *Advances in Neural Information Processing Systems* 13, pp. 430-436. MIT Press, 2001.

(Continued)

*Primary Examiner*—Tony Mahmoudi
*Assistant Examiner*—Michele C Choi
(74) *Attorney, Agent, or Firm*—Bao Tran; Joseph Kolodka

(57) ABSTRACT

Systems and methods for classifying documents each having zero or more links thereto include generating a link matrix; generating a document term matrix; and jointly factorizing the document term matrix and the link matrix.

18 Claims, 6 Drawing Sheets

OTHER PUBLICATIONS

C. Cortes and V. Vapnik. Support-vector networks. *Machine Learning*, 20:273, 1995.

S. C. Deerwester, S. T. Dumais, T. K. Landauer, G. W. Furnas, and R. A. Harshman. Indexing by latent semantic analysis. *Journal of the American Society of Information Science*, 41(6):391-407, 1990.

J. Furnkranz. Exploiting structural information for text classification on the WWW. In 3rd *Symposium on Intelligent Data Analysis*, pp. 487-498, 1999.

P. C. Hansen. *Rank-Deficient and discrete Rl-Posed Problems*. The Society for Industrial and Applied Mathematics, 1998.

X. He, H. Zha, C. Ding, and H. Simon. Web document clustering using hyperlink structures. *Computational Statistics and Data Analysis*, 41(1):19-45, 2002.

T. Hofmann. Probabilistic latent semantic indexing. In *Proceedings of the Twenty-Second Annual International SIGIR Conference*, 1999.

T. Joachims, N. Cristianini, and J. Shawe-Taylor. Composite kernels for hypertext categorisation. In C. Brodley and A. Danyluk, editors, *Proceedings of ICML-01, 18th International Conference on Machine Learning*, pp. 250-257, Williams College, US, 2001. Morgan Kaufmann Publishers, San Francisco, US.

J. M. Kleinberg. Authoritative sources in a hyperlinked environment. *J. ACM*, 48:604-632, 1999.

P. Kolari, T. Finin, and A. Joshi. SYMs for the Blogosphere: Blog Identification and Splog Detection. In AAAI *Spring Symposium on Computational Approaches to Analysing Weblogs*, Mar. 2006.

O. Kurland and L. Lee. Pagerank without hyperlinks: structural re-ranking using links induced by language models. In *SIGIR '05: Proceedings of the 28th annual international ACM SIGIR conference on Research and development in information retrieval*, pp. 306-313, New York, NY, USA, 2005. ACM Press.

A. McCallum, K. Nigam, J. Rennie, and K. Seymore. Automating the construction of internet portals with machine learning. *Information Retrieval Journal*, 3(127-163), 2000.

F. Menczer. Combining link and content analysis to estimate semantic similarity. In *WWW*, 2004.

L. Page, S. Brin, R. Motowani, and T. Winograd. PageRank citation ranking: bring order to the web. *Stanford Digital Library working paper 1997-0072*, 1997.

C. Spearman. "general intelligence," objectively determined and measured. *The American Journal of Psychology*, 15(2):201-292, Apr. 1904.

B. Taskar, P. Abbeel, and D. Koller. Discriminative probabilistic models for relational data. In *Proceedings of 18th International VAl Conference*, 2002.

W. Xu, X. Liu, and Y. Gong. Document clustering based on non-negative matrix factorization. In *SIGIR '03:Proceedings of the 26th annual international ACM SIGIR conference on Research and development in information retrieval*, pp. 267-273. ACM Press, 2003.

Y. Yang, S. Slattery, and R. Ghani. A study of approaches to hypertext categorization. *Journal of Intelligent Information Systems*, 18(2-3):219-241, 2002.

D. Zhou, J. Huang, and B. Scholkopf. Learning from labeled and unlabeled data on a directed graph. In *Proceedings of the 22nd International Conference on Machine Learning*, Bonn, Germany, 2005.

D. Zhau, B. Scholkopf, and T. Hofmann. Semi-supervised learning on directed graphs. *Proc. Neural Info. Processing Systems*, 2004.

\* cited by examiner (a) original graph  (b) factor graph

| method | Cornell | Texas | Washington | Wisconsin |
|---|---|---|---|---|
| SVM on content | 81.00 ± 0.90 | 77.00 ± 0.60 | 85.20 ± 0.90 | 84.30 ± 0.80 |
| SVM on links | 70.10 ± 0.80 | 75.80 ± 1.20 | 80.50 ± 0.30 | 74.90 ± 1.00 |
| SVM on link-content | 80.00 ± 0.80 | 78.30 ± 1.90 | 85.20 ± 0.70 | 84.00 ± 0.90 |
| Directed graph regularization | 89.47 ± 1.11 | 91.28 ± 0.75 | 91.08 ± 0.51 | 89.26 ± 0.45 |
| PLSI+PHITS | 80.71 ± 0.88 | 76.15 ± 1.29 | 85.12 ± 0.37 | 83.75 ± 0.87 |
| link-content MF | 93.50 ± 0.80 | 96.20 ± 0.50 | 93.60 ± 0.50 | 92.60 ± 0.60 |
| link-content sup. MF | 93.80 ± 0.70 | 97.07 ± 1.11 | 93.70 ± 0.60 | 93.00 ± 0.30 |

SYSTEMS AND METHODS FOR CLASSIFYING CONTENT USING MATRIX FACTORIZATION

CROSS-REFERENCE TO RELATED APPLICATIONS

This application claims the benefit of priority to U.S. Provisional Patent Application Ser. No. 60/867,598, filed Nov. 29, 2006, the content of which is incorporated herein by reference in its entirety.

FIELD OF THE INVENTION

The present invention relates to systems for content classification.

BACKGROUND OF THE INVENTION

With the widespread adoption of the World Wide Web, more and more hyper-text documents become available on the Web. Some examples of such data include organization and personal web pages (e.g, the WebKB benchmark data set, which contains university web pages), research papers (e.g., data in CiteSeer), online news articles, and customer-generated media (e.g., blogs). Comparing to data in traditional information management, in addition to content, the data on the Web also contain links such as hyperlinks from a student's homepage pointing to the homepage of her advisor, paper citations, sources of a news article, and comments of one blogger on posts from another blogger, among others. Performing information management tasks on such structured data raises many challenges.

For the classification problem of web pages, a simple approach treats web pages as independent documents. The advantage of this approach is that many off-the-shelf classification tools can be directly applied to the problem. However, this approach relies only on the content of web pages and ignores the structure of links among them.

Link structures provide invaluable information about properties of the documents as well as relationships among them. For example, in the WebKB dataset, the link structure provides additional insights about the relationship among documents (e.g., links often pointing from a student to her advisor or from a faculty member to his projects). Since some links among these documents imply the inter-dependence among the documents, the usual i.i.d. (independent and identical distributed) assumption of documents does not hold. Hence, the traditional classification methods that ignore the link structure may not be suitable.

On the other hand, it is difficult to rely only link structures and ignore content information. For example, in the Cora dataset, the content of a research article abstract largely determines the category of the article. To improve the performance of web page classification, therefore, both link structure and content information should be taken into consideration. To achieve this goal, a simple approach is to convert one type of information to the other. For example, in spam blog classification, outlinks from a blog have been treated as a feature similar to the content features of the blog. In document classification, content similarity among documents has been converted into weights in a Markov chain. However, link and content information have different properties. For example, a link is an actual piece of evidence that represents an asymmetric relationship whereas the content similarity is usually defined conceptually for every pair of documents in a symmetric way. Therefore, directly converting one type of information to the other usually degrades the quality of information. On the other hand, an approach that simply considers link information and content information separately and then combines them in an ad hoc way ignores the inherent consistency between link and content information and therefore fails to combine the two seamlessly.

Link information has been incorporated using co-citation similarity, but this may not fully capture the link structure. In FIG. 1, for example, web pages B and E co-cite web page C, implying that B and E are similar to each other. In turns, A and D should be similar to each other, since A and D cite similar web pages B and E, respectively. But using co-citation similarity, the similarity between A and D is zero without considering other information. In short, the world wide web contains rich textual contents that are interconnected via complex hyperlinks. This huge database violates the assumption held by most of conventional statistical methods that each web page is considered as an independent and identical sample. It is thus difficult to apply traditional mining or learning methods for solving web mining problems, e.g., web page classification, by exploiting both the content and the link structure. Conventional methods typically exploit the link structure or the content information alone, or combine them both in an ad-hoc manner.

SUMMARY OF THE INVENTION

Systems and methods for classifying documents each having zero or more links thereto include generating a link matrix; generating a document term matrix; and jointly factorizing the document term matrix and the link matrix.

Implementations of the above systems and methods may include one or more of the following. The method can generate one or more indicative factors to represent the documents. The documents can include Web pages, emails or referenced documents. Latent semantic space can be used to represent the documents. The method includes mapping the documents to the latent semantic space by determining link structure and content of the documents. The method can represent documents as vectors as well as classifying the vectors and then generating one or more classification results. The method can also include clustering the vectors and then generating one or more clustering results. The method can include generating a document word co-occurrence matrix from the documents. The link matrix can be generated by matrix factorization to represent web pages as one or more principal factors of the link structure. The link matrix can also be generated by matrix factorization to derive a feature representation Z of web pages based on analyzing a link matrix A, where Z is an n×1 matrix, with each row being a 1-dimensional feature vector of a web page. A factorization can be defined as:

$$\min_{Z,U}\|A - ZUZ^T\|_F^2 + \gamma\|U\|_F^2 + \delta\|Z\|_F^2$$

where U is a l×l full matrix and $\gamma$ and $\delta$ are small positive numbers. The method can also determine:

$$\min_{V,Z}\|C - ZV^T\|_F^2 + \beta\|V\|_F^2$$

where C denotes content of web pages as a matrix whose rows represent documents and columns represent keywords, where V denotes a latent space for words, and where β is a small positive number.

The generating a document term matrix can include applying a bag-of-words approach. The system can perform supervised matrix factorization. Data labels can be used to guide a matrix factorization. The system can determine:

$$\min_{U,V,Z,W,b} J_S(U, V, Z, W, b)$$

where $$J_S(U, V, Z, W, b) = J(U, V, Z) + \mathcal{L}_Y(W, b, Z) + \Omega_W(W).$$

A gradient method can be used to minimize $J_s$. A response to a search query can then be based on the jointly factorized document term and link matrices.

Advantages of the system may include one or more of the following. The system combines the information of content and links for web page analysis, mainly on classification application. The system provides a simple approach using factors to model the text content and link structure of web pages/documents. The directed links is generated from the linear combination of linkage of between source and destination factors. By sharing factors between text content and link structure, it is easy to combine both the content information and link structure.

DETAILED DESCRIPTION OF THE INVENTION

Figure 1:
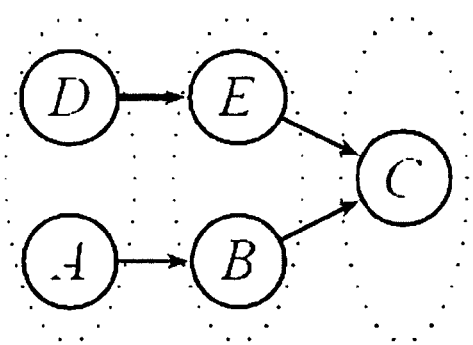
FIG. 1 illustrates an exemplary link structure.
Figure 2:
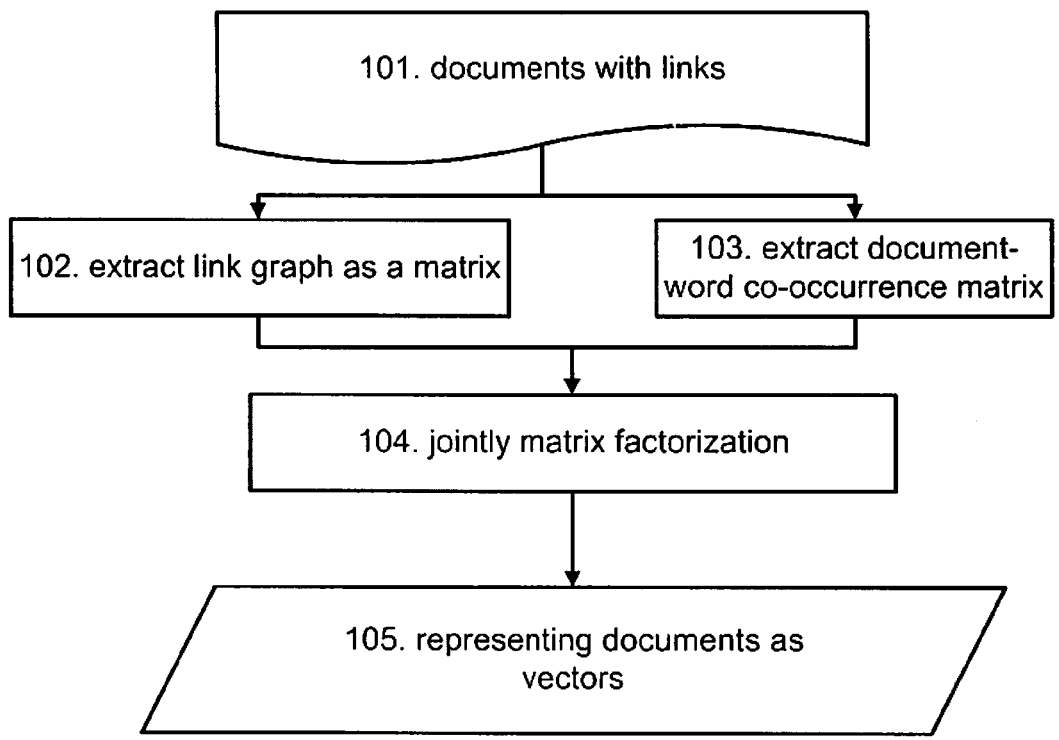
FIG. 2 shows an exemplary process to combine link and content for classification using matrix factorization.

A system for analyzing inter-connected documents, such as web pages, using factor analysis is disclosed in FIG. 2. In the system, both content information and link structures are seamlessly combined through latent factors. The system contains two components. The first component captures the content information. This component has a form similar to that of the latent topics in the Latent Semantic Indexing (LSI) in traditional information retrieval. That is, documents are decomposed into latent topics/factors, which in turn are represented as term vectors. The second component captures the information contained in the underlying link structure, such as links from homepages of students to those of faculty members. A factor can be loosely considered as a type of documents (e.g., those homepages belonging to students). The system does not explicitly define the semantic of a factor a priori. Instead, the factors are learned from the data in a manner similar to LSI. The system uses factor analysis to model the variables associated with entities through the factors and in the analysis of link structures, the system models the relationship of two ends of links, i.e., edges between vertex pairs. Therefore, the model generated by the system involves factors of both vertices of the edge. For the example in FIG. 1, the similarity is implied by the association to the same factors (illustrated by dotted eclipse in the figure). In the model, two components are connected through a set of shared factors, that is, the latent topics in the second component (for contents) are defined to be identical to the factors in the first component (for links). By doing this, the system determines a unified set of latent topics/factors that best explains both content and link structures simultaneously and seamlessly.

In the formulation, factor analysis is performed based on matrix factorization: solution to the first component is based on factorizing the term-document matrix derived from content; solution to the second component is based on factorizing the adjacency matrix derived from links. Because the two factorizations share a common base, the discovered bases (latent topics/factors) explain both content information and link structures, and are then used in further information management tasks such as classification.

FIG. 2 shows an exemplary process to combine link and content for classification using matrix factorization. First, the process retrieves documents with links associated therewith (101). Next, the system extracts a link graph in matrix form, or link matrix factorization (102). The system also extracts a document word co-occurrence matrix (103). Using the link graph and the word co-occurrence matrix, the system generates a joint matrix factorization (104). The documents are represented as vectors (105).

The process of FIG. 2 exploits both the content and linkage information in a principled way, and meanwhile is practically attractive for its great simplicity. The approach carries out a joint factorization on both the linkage adjacency matrix and the document-term matrix, and derives a new representation for web pages in a low-dimensional factor space. Further analysis can be performed based on the compact representation of web pages.

Figure 3:
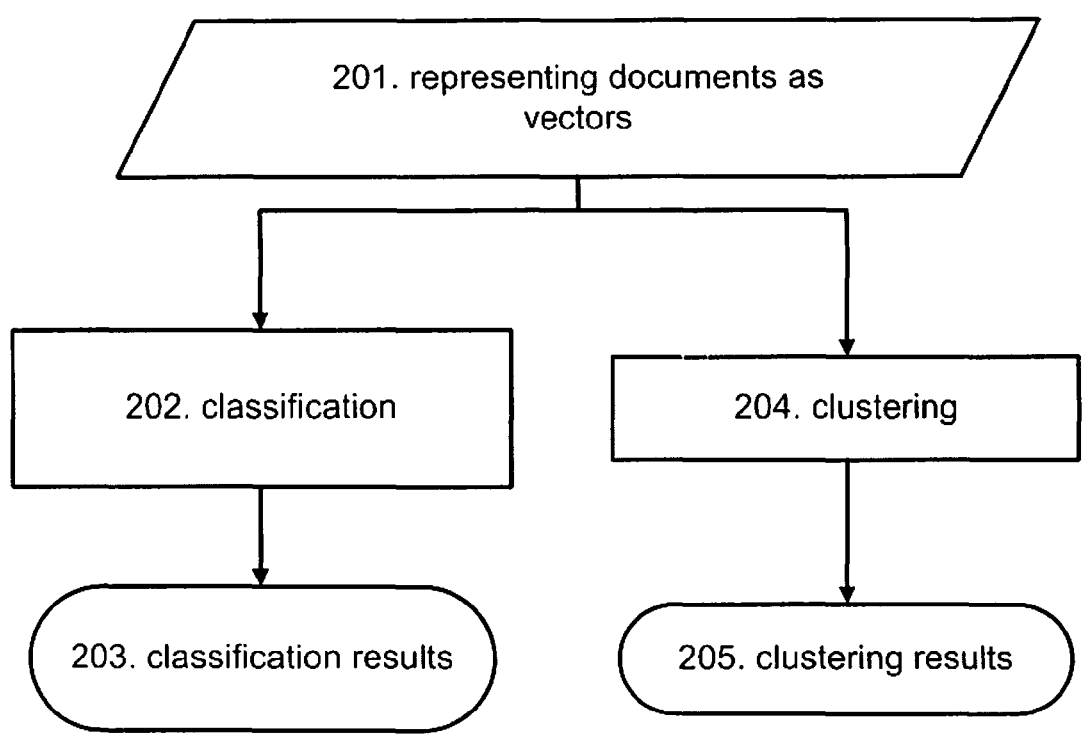
FIG. 3 illustrates an exemplary process to represent documents as vectors.

FIG. 3 illustrates in more detail an exemplary process to represent documents as vectors (201). In this process, the documents undergo a classification process (202) and classification results are generated (203). Correspondingly, documents are clustered (204) and clustering results are generated (205).

Link Matrix Factorization

The link and content information provided to the system can be modeled as a directed graph $G=(V, E)$, where the vertex set $V=\{v_i\}_{i=1}^n$ represents the web pages and the edge set E represents the hyperlinks between web pages. Let $A=\{\alpha_{sd}\}$ denotes the n×n adjacency matrix of G, which is also called the link matrix in this paper. For a pair of vertices, $v_s$ and $v_d$, let $\alpha_{sd}=1$ when there is an edge from $v_s$ to $v_d$, and $\alpha_{sd}=0$, otherwise. A is an asymmetric matrix, because hyperlinks are directed.

The link matrix factorization process derives a high-quality feature representation Z of web pages based on analyzing the link matrix A, where Z is an n×l matrix, with each row being the l-dimensional feature vector of a web page. The new representation of web pages captures the principal factors of the link structure and makes further processing more efficient. The system can use a method similar to LSI, to apply the well-known principal component analysis (PCA) for deriving Z from A. The corresponding optimization problem is $$\min_{Z,U} \|A - ZU^T\|_F^2 + \gamma\|U\|_F^2 + \delta\|Z\|_F^2 \qquad (1)$$

where γ is a small positive number, U is a l×n matrix, and P·P$_F$ is the Frobenius norm. The optimization aims to approximate A by ZU$^T$, a product of two low-rank matrices, with a regularization on U. In the end, the i-th row vector of Z gives the feature vector of vertex $v_i$. Moreover, since A is a nonnegative matrix here, one can put nonnegative constraints on U and V, which produces an algorithm similar to PLSA and NMF.

However, despite its popularity in matrix analysis, PCA (or other similar methods like PLSA) is restrictive for link matrix factorization. PCA ignores the fact that the rows and columns of A are indexed by exactly the same set of objects (i.e., web pages). The approximating matrix Ã=ZU$^T$ shows no evidence that links are within the same set of objects. As an example of the drawback, consider a link transitivity situation $v_i \rightarrow v_s \rightarrow v_j$, where page i is linked to page s which itself is linked to page j. Since Ã=ZU$^T$ treats A as links from web pages $\{v_i\}$ to a different set of objects, let it be denoted by $\{o_i\}$, Ã=ZU$^T$ actually splits a "linked" object $o_s$ from $v_s$ and breaks down the link path into two parts $v_i \rightarrow o_s$ and $v_s \rightarrow o_j$. This is a misinterpretation of the original link path.

To overcome the problem of PCA, a different factorization can be used:

$$\min_{Z,U} \|A - ZUZ^T\|_F^2 + \gamma\|U\|_F^2 + \delta\|Z\|_F^2 \quad (2)$$

where U is a l×l full matrix. Note that U is not symmetric, thus ZUZ$^T$ produces an asymmetric matrix, which is the case of A. Again, each row vector of Z corresponds to a feature vector of a web pages. The new approximating form Ã=ZUZ$^T$ indicates clearly that the links are between the same set of objects, represented by features Z. The factor model actually maps each vertex, $v_i$, into a vector $z_i=\{z_{i,k}; 1 \leq k \leq l\}$ in the $\mathbb{R}^l$ space. The $\mathbb{R}^l$ space is called the factor space. Then, $\{z_i\}$ encodes the information of incoming and outgoing connectivity of vertices $\{v_i\}$. The factor loadings, U, explain how these observed connections happened based on $\{z_i\}$. After determining the vector $z_i$, traditional classification methods (such as SVMs) or clustering tools (such as K-Means) can be used to perform the analysis.

Figure 4:
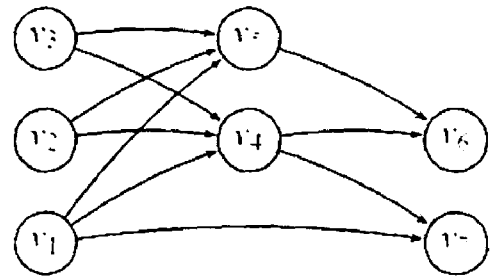
FIG. 4 shows an exemplary representation of a graph using factor graph.
Figure 4:
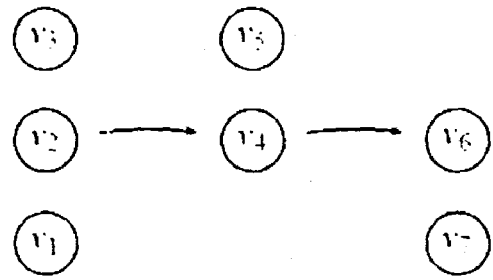

FIG. 4(a) illustrates the advantages of the proposed link matrix factorization Eq. (2), where the vertices $v_1$, $v_2$ and $v_3$ on the left side all point to the vertices $v_4$ and $v_5$ in the middle, the vertices $v_4$ and $v_5$ in turn point to the vertices $v_6$ and $v_7$ in the right side except for no link from $v_5$ to $v_7$. There are no links from the vertices $v_1$, $v_2$ and $v_3$ to the vertices $v_6$ and $v_7$ except for link from $v_1$ to $v_7$.

Given these observations, the graph is summarized by grouping the vertices $v_1$, $v_2$ and $v_3$ into cluster 1, the vertices $v_4$ and $v_5$ into cluster 2, the vertices $v_6$ and $v_7$ into cluster 3, and assign edges from clusters 1 to 2 and 2 to 3. A factor graph can be generated as shown in FIG. 4(b), where cluster 1 is on the left, cluster 2 on the middle and cluster 3 on the right. The factor graph summarizes the structure of the original graph.

In the next operation the system performs the two factorization methods Eq. (2) and Eq. (1) on this link matrix. A good low-rank representation should reveal the structure of the factor graph.

First, A is factorized by ZUZ$^T$ via solving Eq. 2, and the results are:

$$Z = \begin{bmatrix} 0.92 & -0.57 & 0.26 \\ 0.80 & -0.68 & 0.24 \\ 0.80 & -0.68 & 0.24 \\ -0.04 & 1.27 & 0.22 \\ -0.17 & 1.16 & 0.19 \\ -0.58 & -0.83 & 1.00 \\ -0.40 & -0.16 & 0.66 \end{bmatrix}, U = \begin{bmatrix} 0.19 & 0.66 & 1.04 \\ -0.22 & -0.11 & 0.47 \\ -0.03 & 0.31 & 0.92 \end{bmatrix},$$

The resultant Z is consistent with the clustering structure of vertices: $z_1$, $z_2$ and $z_3$ are similar, $z_4$, $z_5$ are similar, and $z_6$, $z_7$ also appear to be close. If for each row of Z the biggest element is set to one, and the remaining elements in the same row to be zero, then a clustering indicator matrix can be obtained as follows:

$$\begin{bmatrix} 1 & 0 & 0 \\ 1 & 0 & 0 \\ 1 & 0 & 0 \\ 0 & 1 & 0 \\ 0 & 1 & 0 \\ 0 & 0 & 1 \\ 0 & 0 & 1 \end{bmatrix},$$

which tells the assignment of vertices to clusters. If one wants to get clustering results, there are generally two approaches based on the matrix factorization. One is to first derive the low-rank feature vectors and then apply methods like K-means. The other is to put non-negative constraints on Z and U in solving Eq. 2. However, when the interpretability is not important in some tasks, for example, classification, the system achieves better accuracies without nonnegative constraints.

In contrast, the following results are obtained by PCA (solving Eq. 1), $$Z = \begin{bmatrix} -1.65 & 0.22 & 0.46 \\ -1.34 & -0.35 & -0.29 \\ -1.34 & -0.35 & -0.29 \\ -0.39 & 1.35 & 0.13 \\ -0.07 & 0.78 & -0.62 \\ 0 & 0 & 0 \\ 0 & 0 & 0 \end{bmatrix}, U = \begin{bmatrix} 0 & 0 & 0 \\ 0 & 0 & 0 \\ 0 & 0 & 0 \\ -0.67 & -0.18 & -0.14 \\ -0.67 & -0.18 & -0.14 \\ -0.07 & 0.78 & -0.62 \\ -0.32 & 0.58 & 0.75 \end{bmatrix}.$$

PCA treats each vertex as two independent objects, i.e., one is a "linking" vertex and the other is a "linked" vertex. Therefore, the obtained Z summarizes only the out-going link structure while U summarizes only the in-coming link structure. However neither Z nor U alone sufficiently describes the structure of the graph. For example, $z_1$ does not seems to be similar to $z_2$ and $z_3$, $z_4$ and $z_5$ also look very different. On the other hand, $u_6$ and $u_7$ appear to very dissimilar. Further more, those zero rows in both Z and U are not desired, because all the different linear operators acting on them produce the same result, i.e., zero, which will make problems if operator gradients have to be computed. Given our above analysis, it is clear that the factorization ZUZ$^T$ is more expressive than ZU$^T$ in representing the link matrix A.

Content Matrix Factorization

Next the factorization of the content information on the vertices will be discussed. To combine the link information and content information, the same latent space is used to approximate the content as the latent space for the links. Using the bag-of-words approach, the system denotes the content of web pages by a n×m matrix C, each of whose rows represents a document, each column represents a keyword, where m is the number of keywords. Like the latent semantic indexing (LSI), the l-dimensional latent space for words is denoted by a m×l matrix V. Therefore, $ZV^T$ is used to approximate matrix C, $$\min_{V,Z} \|C - ZV^T\|_F^2 + \beta \|V\|_F^2 \tag{3}$$

where $\beta$ is a small positive number, $\beta\|V\|_F^2$ serves as a regularization term to improve the robustness.

Joint Link-Content Matrix Factorization

While there are many ways to employ both the content and link information for web page classification, the preferred embodiment fuses them into a single, consistent, and compact feature representation. To achieve this goal, the system solves the following:

$$\min_{U,V,Z} \|A - ZUZ^T\|_F^2 + \alpha\|C - ZV^T\|_F^2 + \gamma\|U\|_F^2 + \beta\|V\|_F^2 + \delta\|Z\|_F^2 \stackrel{def}{=} \mathcal{J}(U, V, Z). \tag{4}$$

Figure 5:
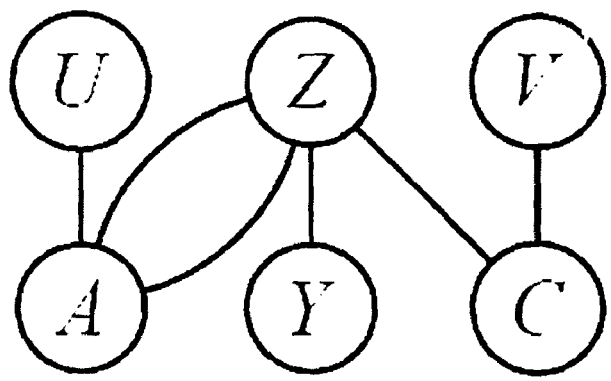
FIG. 5 shows exemplary relationships among matrices.

Eq. 4 is the joined matrix factorization of A and C with regularization. The new representation Z is ensured to capture both the structures of the link matrix A and the content matrix C. Once the optimal Z is determined, the system applies the traditional classification or clustering methods on vectorial data Z. The relationship among these matrices can be depicted as FIG. 5 showing the relationship among the matrices. Node Y is the target of classification.

Eq. 4 can be solved using gradient methods, such as the conjugate gradient method and quasi-Newton methods. Then main computation of gradient methods is evaluating the object function J and its gradients against variables, $$\frac{1}{2}\frac{\partial J}{\partial U} = (Z^T Z U Z^T Z - Z^T A Z) + \gamma U,$$

$$\frac{1}{2}\frac{\partial J}{\partial V} = \alpha(V Z^T Z - C^T Z) + \beta V,$$

$$\frac{1}{2}\frac{\partial J}{\partial Z} = \begin{pmatrix} ZU^T Z^T ZU + ZUZ^T ZU^T - \\ A^T ZU - AZU^T \end{pmatrix} + \alpha(ZV^T V - CV) + \delta Z.$$

Because of the sparsity of A, the computational complexity of multiplication of A and Z is $O(\mu_A l)$, where $\mu_A$ is the number of nonzero entries in A. Similarly, the computational complexity of $C^T Z$ and CV is $O(\mu_C l)$, where $\mu_C$ is the number of nonzero entries in C. The computational complexity of the rest multiplications in the gradient computation is $O(nl^2)$. Therefore, the total computational complexity in one iteration is $O(\mu_A l + \mu_C l + nl^2)$. The number of links and the number of words in a web page are relatively small comparing to the number of web pages, and are almost constant as the number of web pages/documents increases, i.e. $\mu_A = O(n)$ and $\mu_C = O(n)$. Therefore, theoretically the computation time is almost linear to the number of web pages/documents, n.

Supervised Matrix Factorization

For a web page classification problem, Eq. 4 can be solved to obtain Z and a traditional classifier can be used to perform classification. However, this approach does not take data labels into account in the first step. Since using data labels improves the accuracy by obtaining a better Z for the classification, the system uses the data labels to guide the matrix factorization, called supervised matrix factorization. Because some data used in the matrix factorization have no label information, the supervised matrix factorization falls into the category of semi-supervised learning.

Let C be the set of classes. For simplicity, a binary class problem, i.e. $C=\{-1,1\}$ is considered. Assume the labels $\{y_i\}$ for vertices in $T \subset V$ are known. For a hypothesis $h: V \to \mathbb{R}$, such that $v_i$ is assigned to 1 when $h(v_i) \geq 0$, $-1$ otherwise, a transform from the latent space to $\mathbb{R}$, can be assumed to be linear, i.e.

$$h(v_i) = w^T \phi(v_i) + b = w^T z_i + b, \tag{5}$$

where w and b are parameters to estimate. Here, w is the norm of the decision boundary. Similar to Support Vector Machines (SVMs), the hinge loss can be used to measure the loss, $$\Sigma_{i:v_i \in T}[1 - y_i h(v_i)]_+,$$

where $[x]_+$ is x if $x \geq 0$, 0 if $x<0$. However, the hinge loss is not smooth at the hinge point, which makes it difficult to apply gradient methods on the problem. To overcome the difficulty, a smoothed version of hinge loss for each data point, $$g(y_i h(v_i)), \tag{6}$$

where $$g(x) = \begin{cases} 0 & \text{when } x \geq 2, \\ 1 - x & \text{when } x \leq 0, \\ \frac{1}{4}(x-2)^2 & \text{when } 0 < x < 2. \end{cases}$$

Figure 6:
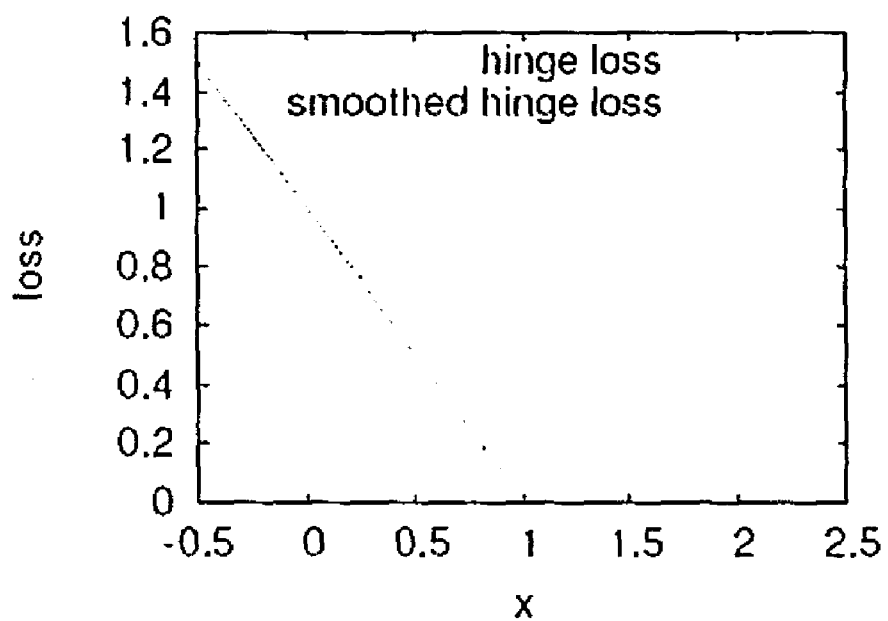
FIG. 6 shows differences between two loss functions.

FIG. 6 shows the difference between these two loss functions. The difference occurs around the hinge.

Next, the multiclass problem is reduced into multiple binary ones. One simple scheme of reduction is the one-against-rest coding scheme. In the one-against-rest scheme, a label vector is assigned for each class label. The element of a label vector is 1 if the data point belongs the corresponding class, $-1$, if the data point does not belong the corresponding class, 0, if the data point is not labeled. Let Y be the label matrix, each column of which is a label vector. Therefore, Y is a matrix of n×c, where c is the number of classes, |C|. Then the values of Eq. (5) form a matrix $$H = ZW^T + 1b^T, \tag{7}$$

where 1 is a vector of size n, whose elements are all one, W is a c×l parameter matrix, and b is a parameter vector of size c. The total loss is proportional to the sum of Eq. (6) over all labeled data points and the classes, $$\mathcal{L}_Y(W, b, Z) = \lambda \Sigma_{i:v_i \in T, j \in C} g(Y_{ij} H_{ij}),$$

where $\lambda$ is the parameter to scale the term.

To derive a robust solution, a Tikhonov regularization for W is used:

$$\Omega_W(W) = \frac{v}{2} PWP_F^2,$$

where $v$ is the parameter to scale the term.

Then the supervised matrix factorization problem becomes $$\min_{U,V,Z,W,b} J_s(U, V, Z, W, b) \text{ where} \quad (8)$$

$$J_s(U, V, Z, W, b) = J(U, V, Z) + \mathcal{L}_Y(W, b, Z) + \Omega_W(W).$$

Gradient methods are used to solve Eq. (8). The gradients are $$\frac{\partial J_s}{\partial U} = \frac{\partial J}{\partial U},$$

$$\frac{\partial J_s}{\partial V} = \frac{\partial J}{\partial V},$$

$$\frac{\partial J_s}{\partial Z} = \frac{\partial J}{\partial Z} + \lambda GW,$$

$$\frac{\partial J_s}{\partial W} = \lambda G^T Z + vW,$$

$$\frac{\partial J_s}{\partial b} = \lambda G^T 1,$$

where G is a n×c matrix, whose ik-th element is $Y_{ik} g'(Y_{ik} H_{ik})$, and $$g'(x) = \begin{cases} 0 & \text{when } x \geq 2, \\ -1 & \text{when } x \leq 0, \\ \frac{1}{2}(x-2) & \text{when } 0 < x < 2. \end{cases}$$

Once w, b, and Z are obtained, h can be applied on the vertices with unknown class labels, or apply traditional classification algorithms on Z to get the classification results.

Figure 7:
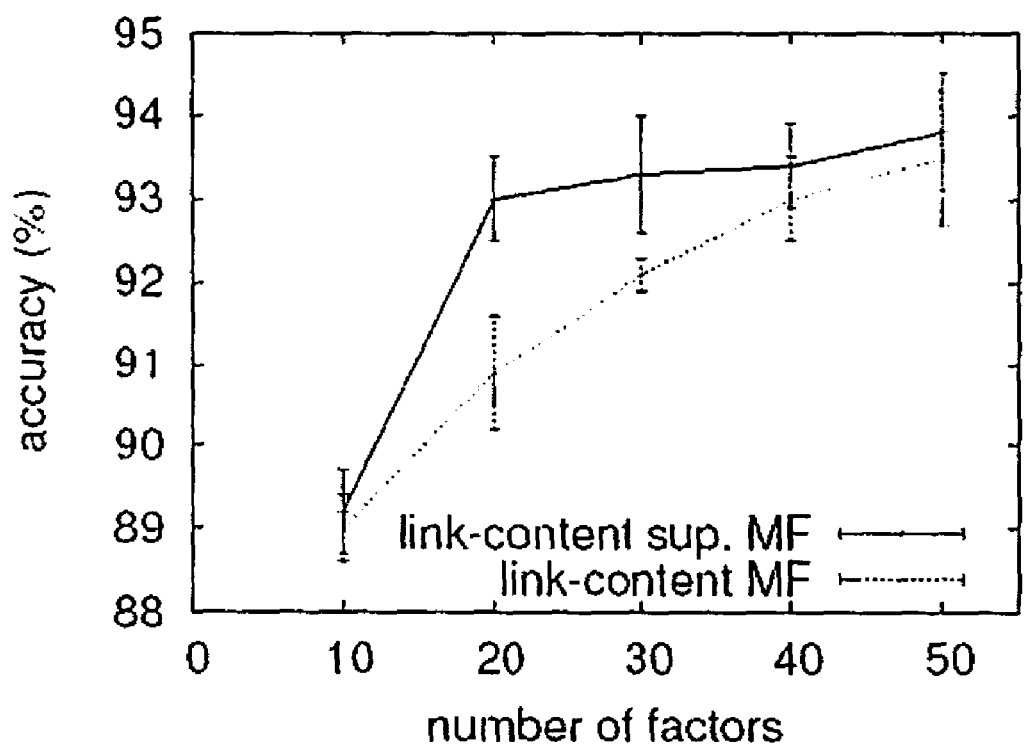
FIGS. 7-8 show exemplary charts illustrating accuracy verses dimensionality for two different data sets.
Figure 8:
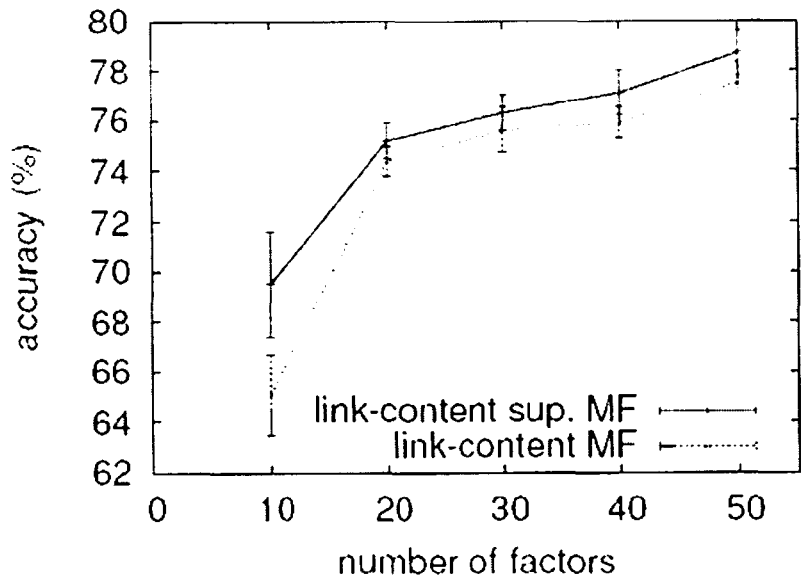

FIGS. 7-8 show an exemplary set of experimental results illustrating the effectiveness of the system of FIG. 2. The process of FIG. 2 exploits both the content and linkage information in a principled way, and meanwhile is practically attractive for its great simplicity. The approach carries out a joint factorization on both the linkage adjacency matrix and the document-term matrix, and derives a new representation for web pages in a low-dimensional factor space. Further analysis can be performed based on the compact representation of web pages. In the experiments, the system is compared with state-of-the-art methods and demonstrates an excellent accuracy in hypertext classification on the WebKB and Cora benchmarks.

The WebKB data set consists of about 6000 web pages from computer science departments of four schools (Cornell, Texas, Washington, and Wisconsin). The web pages are classified into seven categories. The numbers of pages in each category are shown in Table 1.

TABLE 1

Dataset of WebKB

| School | course | dept. | faculty | other | project | staff | student | total |
|---|---|---|---|---|---|---|---|---|
| Cornell | 44 | 1 | 34 | 581 | 18 | 21 | 128 | 827 |
| Texas | 36 | 1 | 46 | 561 | 20 | 2 | 148 | 814 |
| Washington | 77 | 1 | 30 | 907 | 18 | 10 | 123 | 1166 |
| Wisconsin | 85 | 0 | 38 | 894 | 25 | 12 | 156 | 1210 |

The Cora data set consists of the abstracts and references of about 34,000 computer science research papers. Part of the data set was used to categorized into one of subfields of data structure (DS), hardware and architecture (HA), machine learning (ML), and programming language (PL). Those articles without reference to other articles in the set were removed. The number of papers and the number of subfields in each area are shown in Table 2.

TABLE 2

Dataset of Cora webkb

| Area | # of papers | # of subfields |
|---|---|---|
| Data structure (DS) | 751 | 9 |
| Hardware and architecture (HA) | 400 | 7 |
| Machine learning (ML) | 1617 | 7 |
| Programing language (PL) | 1575 | 9 |

TABLE 3

Classification accuracy (mean ± std-dev %) on WebKB data set

| method | Cornell | Texas | Washington | Wisconsin |
|---|---|---|---|---|
| SVM on content | 81.00 ± 0.90 | 77.00 ± 0.60 | 85.20 ± 0.90 | 84.30 ± 0.80 |
| SVM on links | 70.10 ± 0.80 | 75.80 ± 1.20 | 80.50 ± 0.30 | 74.90 ± 1.00 |
| SVM on link-content | 80.00 ± 0.80 | 78.30 ± 1.00 | 85.20 ± 0.70 | 84.00 ± 0.90 |
| Directed graph regularization | 89.47 ± 1.41 | 91.28 ± 0.75 | 91.08 ± 0.51 | 89.26 ± 0.45 |
| PLSI + PHITS | 80.74 ± 0.88 | 76.15 ± 1.29 | 85.12 ± 0.37 | 83.75 ± 0.87 |
| link-content MF | 93.50 ± 0.80 | 96.20 ± 0.50 | 93.60 ± 0.50 | 92.60 ± 0.60 |
| link-content sup. MF | 93.80 ± 0.70 | 97.07 ± 1.11 | 93.70 ± 0.60 | 93.00 ± 0.30 |

The experiments classify the data based on their content information and/or link structure. The following methods were benchmarked:

SVM on content—support vector machines (SVM) were used on the content of documents. The features are the bagof-words. This method ignores link structure in the data. The regularization parameter of SVM is selected using the cross-validation method. The implementation of SVM used in the experiments is libSVM.

SVM on links—links were treated as the features of each document, i.e. the i-th feature is link-to-page i. SVM were applied to link features. This method used link information, but not the link structure.

SVM on link-content—Features of the above two methods were combined. Different weights were used for these two set of features. The weights were also selected using cross-validation.

Directed graph regularization This method were solely based on link structure.

PLSI+PHITS This method combined text content information and link structure for analysis. The PHITS algorithm was similar to Eq. 1, with an additional nonnegative constraint and modeled the out-going and in-coming structures separately.

Link-content MF This is the matrix factorization approach discussed above with 50 latent factors for Z. After computing Z, a linear SVM was trained on the training portion of Z, then applied to testing portion of Z to obtain the final result because of the multiclass output.

Link-content sup. MF This method is the supervised matrix factorization discussed above. 50 latent factors were used for Z. After computing Z, a linear SVM was trained on the training portion of Z, then SVM was applied to the testing portion of Z to obtain the final result because of the multiclass output.

The test process randomly splits data into five folds and repeats the experiment for five times, for each time the process uses one fold for test, four other folds for training. During the training process, the process uses the cross-validation to select all model parameters. The results were measured by the classification accuracy, i.e., the percentage of the number of correct classified documents in the entire data set. The results are shown as the average classification accuracies and it standard deviation over the five repeats.

The average classification accuracies for the WebKB data set are shown in Table 3. For this task, the accuracies of SVM on links are worse than that of SVM on content. But the directed graph regularization, which is also based on link alone, achieves a much higher accuracy. This implies that the link structure plays an important role in the classification of this dataset, but individual links in a web page give little information. The combination of link and content using SVM achieves similar accuracy as that of SVM on content alone, which confirms individual links in a web page give little information. Since our approach consider the link structure as well as the content information, our two methods give results a highest accuracies among these approaches. The difference between the results of our two methods is not significant. The experiments below show the differences between them. The classification accuracies for the Cora data set are shown in Table 4.

TABLE 4

Classification accuracy (mean ± std-dev %) on Cora data set

| method | DS | HA | ML | PL |
|---|---|---|---|---|
| SVM on content | 53.70 ± 0.50 | 67.50 ± 1.70 | 68.30 ± 1.60 | 56.40 ± 0.70 |
| SVM on links | 48.90 ± 1.70 | 65.80 ± 1.40 | 60.70 ± 1.10 | 58.20 ± 0.70 |
| SVM on link-content | 63.70 ± 1.50 | 70.50 ± 2.20 | 70.56 ± 0.80 | 62.35 ± 1.00 |
| Directed | 46.07 ± | 65.50 ± | 59.37 ± | 56.06 ± |

TABLE 4-continued

Classification accuracy (mean ± std-dev %) on Cora data set

| method | DS | HA | ML | PL |
|---|---|---|---|---|
| graph regularization | 0.82 | 2.30 | 0.96 | 0.84 |
| PLSI + PHITS | 53.60 ± 1.78 | 67.40 ± 1.48 | 67.51 ± 1.13 | 57.45 ± 0.68 |
| link-content MF | 61.00 ± 0.70 | 74.20 ± 1.20 | 77.50 ± 0.80 | 62.50 ± 0.80 |
| link-content sup. MF | 69.38 ± 1.80 | 74.20 ± 0.70 | 78.70 ± 0.90 | 68.76 ± 1.32 |

In this experiment, the accuracy of SVM on the combination of links and content are higher than either SVM on content or SVM on links. This indicates both content and links are informative for classifying the articles into subfields. The method of directed graph regularization does not perform as good as SVM on link-content, which confirms the importance of the article content in this task. Though the system's method of link-content matrix factorization perform slightly better than other methods, its method of link-content supervised matrix factorization outperforms others significantly.

Figure 9:
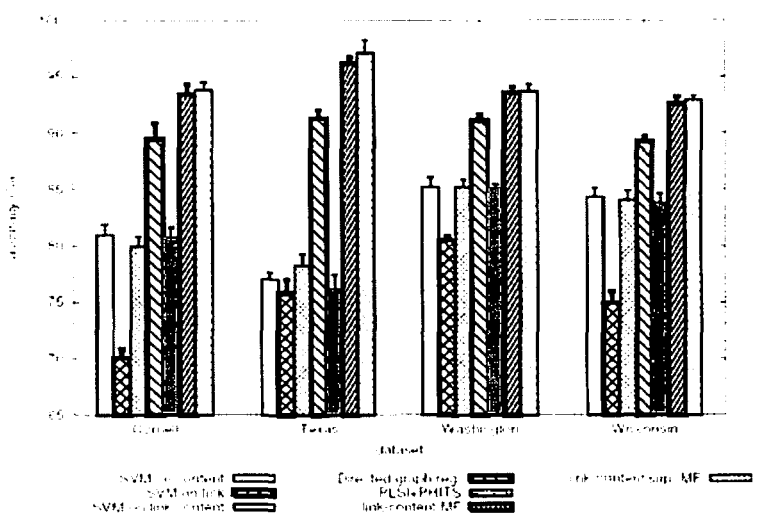
FIGS. 9-10 show exemplary experimental results illustrating the effectiveness of the system of FIG. 2.
Figure 10:
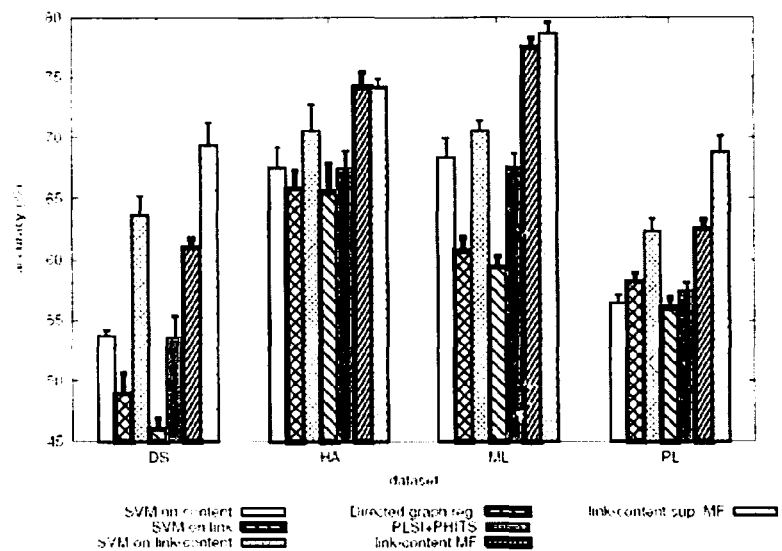

As discussed above, the computational complexity of each iteration for solving the optimization problem is quadratic to the dimensionality of latent variables. Experiments were done to study how the dimensionality of latent variables affects the accuracy of predication. Different numbers of dimensions for the Cornell data of WebKB data set and the machine learning (ML) data of Cora data set were used, with the result shown in FIGS. 9-10. The figures show that the accuracy increases as the number of dimensionality of latent variables increases. It is a different concept from choosing the "optimal" number of clusters in clustering application. It is how much information to represent in the latent variables. The regularization over the latent variables can be used to avoid the overfit problem for a large number of dimensionality. To choose of the number of dimensionality of latent variables, the trade-off between the accuracy and the computation time, which is quadratic to the number of dimensionality, should be considered. The difference between the method of matrix factorization and that of supervised one decreases as the number of dimensionality of latent variables increases.

The loss functions $L_A$ in Eq. 2 and $\mathcal{L}_C$ in Eq. 3 use squared loss due to computationally convenience. Actually, squared loss does not precisely describe the underlying noise model, because the weights of adjacency matrix can only take nonnegative values, in our case, zero or one only, and the components of content matrix C can only take nonnegative integers. Therefore, other types of loss can be used, such as hinge loss or smoothed hinge loss, e.g.

$$\mathcal{L}_A(U,Z) = \mu h(A, ZUZ^T),$$

where $h(A, B) = \Sigma_{i,j}[1 - A_{ij}B_{ij}]_+$.

In the application of classification, an entry of matrix Z means the relationship of a web page and a factor. The values of the entries are the weights of linear model, instead of the probabilities of web pages belonging to latent topics. Therefore, the components can take any possible real values.

In the clustering application, the model can be used to find Z, and then K-means can be applied to partition the web pages into clusters. Moreover, nonnegative matrix factorization can be used for clustering to directly cluster web pages. As the example with nonnegative constraints, each cluster is represented by a latent topic, i.e. the dimensionality of the latent space is set to the number of desired clusters. Then the problem of Eq. 4 becomes $$\min_{U,V,Z} J(U, V, Z), \text{ s.t. } Z \geq 0. \quad (9)$$

Solving Eq. 9 can be done to obtain more interpretable results, which could be used for clustering.

The system of FIG. 2 combines the information of content and links for web page analysis, mainly on classification application. The system provides a simple approach using factors to model the text content and link structure of web pages/documents. The directed links is generated from the linear combination of linkage of between source and destination factors. By sharing factors between text content and link structure, it is easy to combine both the content information and link structure.

In the content analysis part, the system is similar to LSI in mapping documents into a lower dimensional latent space. The latent space implicitly captures a large portion of information of documents—therefore it is called the latent semantic space. The similarity between documents could be defined by the dot products of the corresponding vectors of documents in the latent space. Analysis tasks, such as classification, could be performed on the latent space. The commonly used singular value decomposition (SVD) method ensures that the data points in the latent space can optimally reconstruct the original documents. Though the system also uses latent space to represent web pages (documents), the system considers the link structure as well as the content of web pages. The system considers the directed linkage between topics of source and destination web pages, which implies the topic combines the information of web page as authorities and as hubs. Instead of using graph Laplacian as used in the link analysis approach, the system uses the latent space, which can easily introduce the information of web page content. In the system, the link is constructed with the linkage between the factor of the source web page and the factor of the destination web page, instead of the destination web page itself. The factor of the destination web page contains information of its outgoing links. In turn, such information is passed to the factor of the source web page. As the result of matrix factorization, the factor forms a factor graph, a miniature of the original graph, preserving the major structure of the original graph.

In the above discussion, the tasks of web page classification and clustering are discussed as illustrating examples. However, the techniques discussed above are applicable equally well to many other tasks in information retrieval and data mining.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g. a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A computer-implemented method for classifying documents each having zero or more links thereto, comprising:
   a. generating a link matrix;
   b. generating a document term matrix;
   c. jointly factorizing the document term matrix and the link matrix to classify the documents, wherein the link matrix is generated by matrix factorization to derive a feature representation Z of web pages based on analyzing a link matrix A, where said Z is an n×l matrix with each row being an l-dimensional feature vector of a web page;
   d. applying a factorization defined as:

$$\min_{Z,U} \|A - ZUZ^T\|_F^2 + \gamma \|U\|_F^2 + \delta \|Z\|_F^2$$

where F is a Frobius form, T is a transpose, U is a l×l full matrix, and γ and δ are positive numbers; and
   e. determining $$\min_{V,Z} \|C - ZV^T\|_F^2 + \beta \|V\|_F^2$$

where C denotes content of web pages as a matrix whose rows represent documents and columns represent keywords, V denotes a latent space for words, and β is a positive number.

2. The computer-implemented method of claim 1, comprising generating one or more indicative factors to represent the documents.

3. The computer-implemented method of claim 1, wherein the document comprises one of: a Web page, an email, and a referenced document.

4. The computer-implemented method of claim 1, comprising using latent semantic space to represent the documents.

5. The computer-implemented method of claim 4, comprising mapping the documents to the latent semantic space by determining a link structure and content of the documents.

6. The computer-implemented method of claim 1, comprising representing the documents as vectors.

7. The computer-implemented method of claim 6, comprising classifying the vectors.

8. The computer-implemented method of claim 7, comprising generating one or more classification results.

9. The computer-implemented method of claim 6, comprising clustering the vectors.

10. The computer-implemented method of claim 9, comprising generating one or more clustering results.

11. The computer-implemented method of claim 1, comprising generating a document word co-occurrence matrix from the documents.

12. The computer-implemented method of claim 1, wherein the link matrix is generated by the matrix factorization to represent web pages as one or more principal factors of a link structure.

13. The computer-implemented method of claim 1, wherein generating the document term matrix comprises applying a bag-of-words approach.

14. The computer-implemented method of claim 1, comprising performing supervised matrix factorization.

15. The computer-implemented method of claim 14, comprising using data labels to guide the matrix factorization.

16. The computer-implemented method of claim 14, comprising determining a Tikhonov regularization.

17. The computer-implemented method of claim 16, comprising applying a gradient method.

18. The computer-implemented method of claim 1, comprising generating a response to a search query based on the jointly factorized document term and link matrices.

* * * * *